United States Patent [19]

Hahn et al.

[11] Patent Number: 4,647,256
[45] Date of Patent: Mar. 3, 1987

[54] METHOD AND APPARATUS FOR PRODUCING UNDERGROUND PIPES

[75] Inventors: Volker Hahn, Leinfelden-Echterdingen; Eberhard Beitinger, Stuttgart, both of Fed. Rep. of Germany

[73] Assignee: Ed. Züblin Aktiengesellschaft, Stuttgart, Fed. Rep. of Germany

[21] Appl. No.: 706,733

[22] Filed: Feb. 28, 1985

[30] Foreign Application Priority Data

Feb. 29, 1984 [DE] Fed. Rep. of Germany ....... 3407381

[51] Int. Cl.⁴ .......................... E02D 29/10; F16L 1/02
[52] U.S. Cl. ..................................... 405/184; 138/155; 138/157; 138/170; 138/DIG. 1; 405/155
[58] Field of Search ....................... 405/184, 154, 155; 138/155, 156, 157, 170, DIG. 1

[56] References Cited

U.S. PATENT DOCUMENTS

| 2,005,699 | 6/1935 | Gottwald | 138/157 |
| 3,107,741 | 10/1963 | Adams et al. | 405/184 X |
| 4,075,300 | 2/1978 | Keller | 405/155 X |
| 4,094,152 | 6/1978 | Jutte | 405/184 |
| 4,200,480 | 4/1980 | Wolinski et al. | 138/DIG. 1 X |
| 4,314,775 | 2/1982 | Johnson | 405/155 |
| 4,343,573 | 8/1982 | Breitfuss | 405/155 |
| 4,400,108 | 8/1983 | Freeman | 405/155 |
| 4,534,676 | 8/1985 | Saito | 405/184 |
| 4,564,314 | 1/1986 | Gallagher | 405/155 |
| 4,571,122 | 2/1986 | Yamamoto et al. | 405/184 |

FOREIGN PATENT DOCUMENTS

| 634612 | 1/1962 | Canada | 405/184 |
| 2128709 | 5/1984 | United Kingdom | 138/156 |

Primary Examiner—Albert J. Makay
Assistant Examiner—Steven E. Warner
Attorney, Agent, or Firm—Becker & Becker, Inc.

[57] ABSTRACT

A method of producing underground pipes, with pipe sections being pressed ahead into the ground. For each pipe section, at least two partial pipe shells are used which are separated from one another in the longitudinal direction, and are joined about supply lines which are guided through the pipe. The joining process is effected before the pipe section is pressed into the ground. With this method, the supply lines do not have to be interrupted when a new pipe section is introduced. The apparatus for carrying out the method is provided with at least one joining station for joining the partial pipe shells in a precisely fitting manner, and a combining station for interconnecting the partial pipe shells.

7 Claims, 27 Drawing Figures

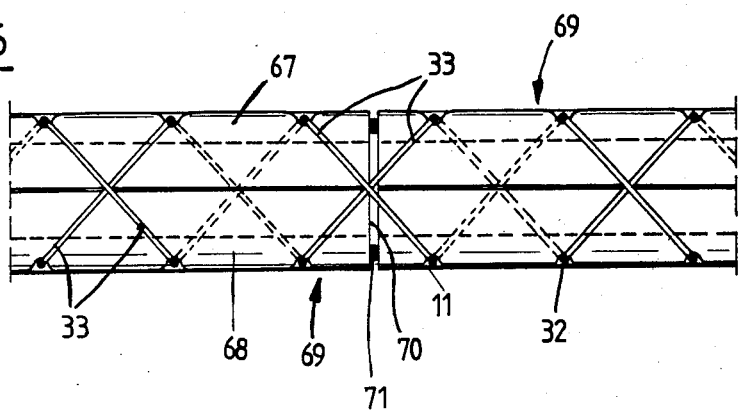
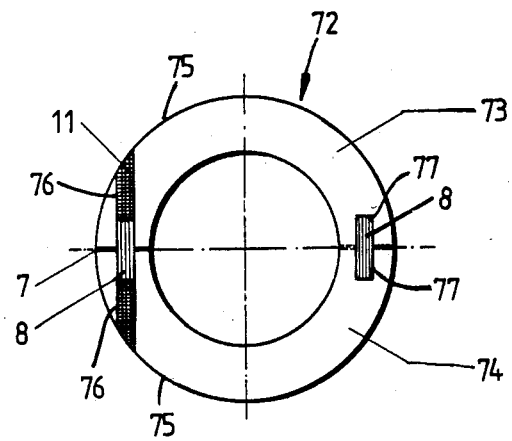
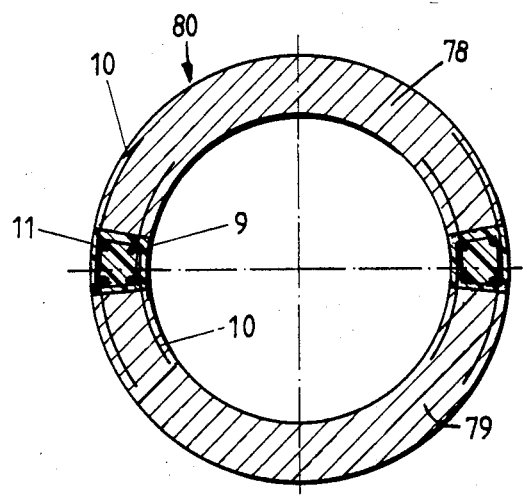

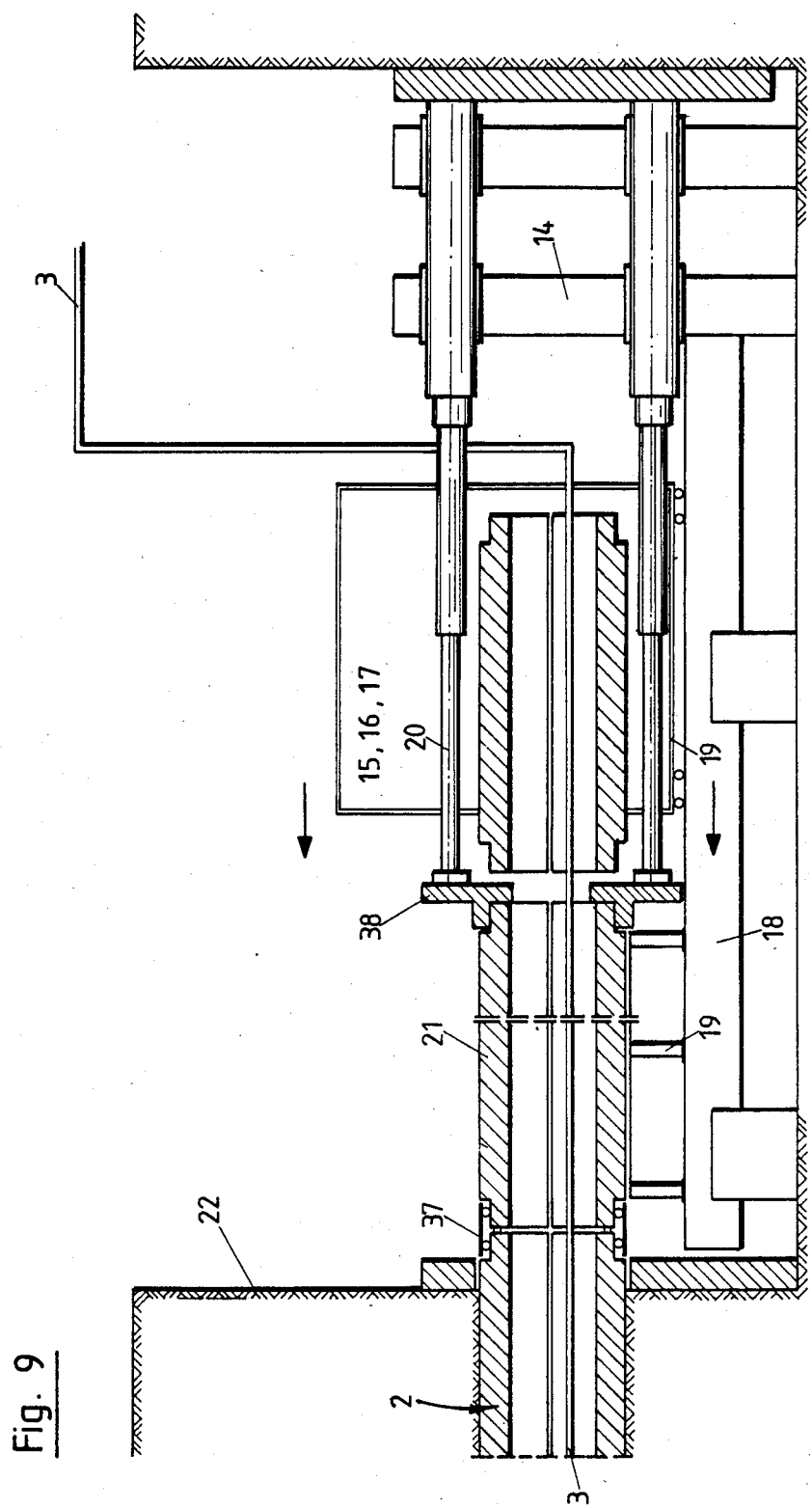

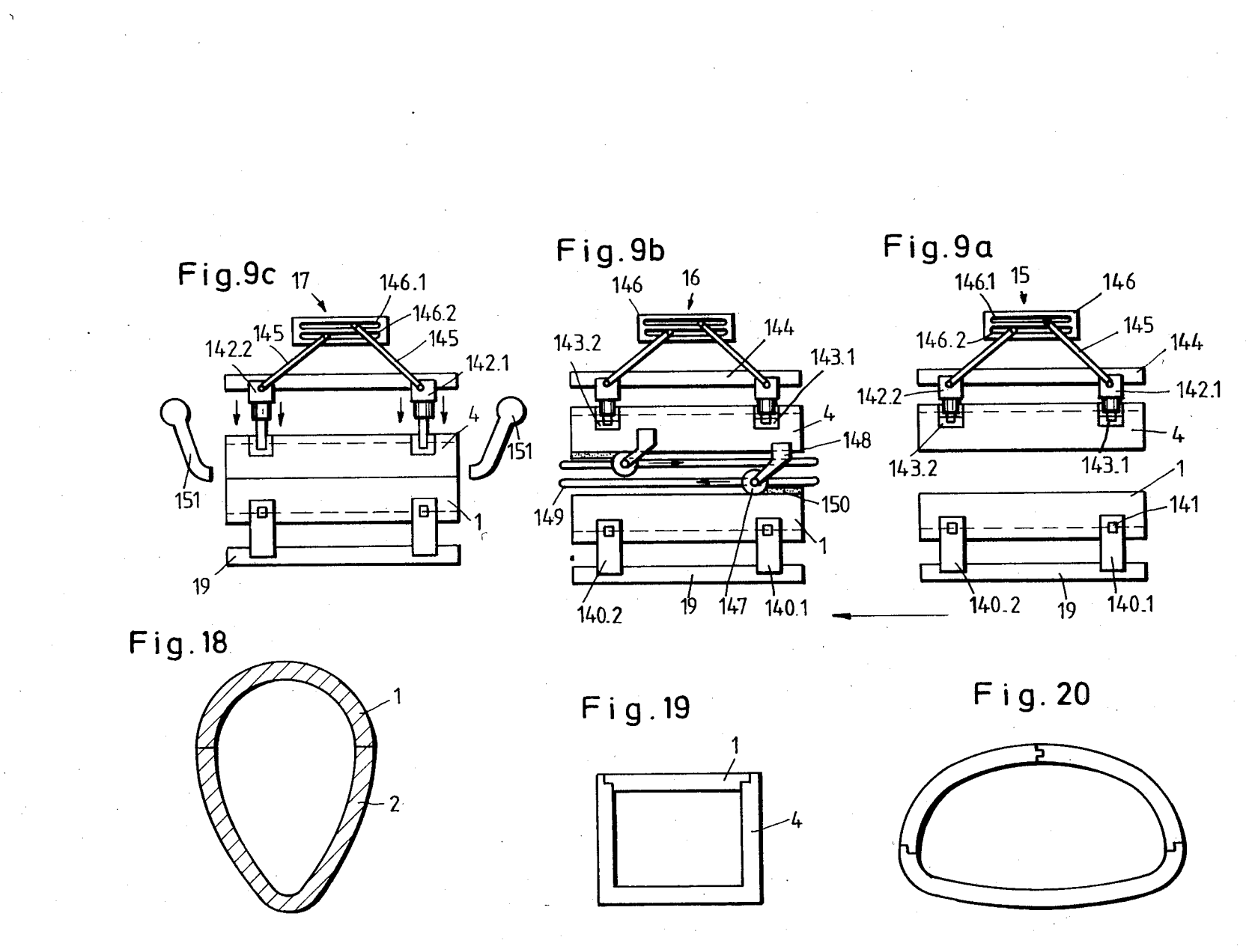

METHOD AND APPARATUS FOR PRODUCING UNDERGROUND PIPES

BACKGROUND OF THE INVENTION

1. Field of the Invention

The present invention relates to a method of producing underground pipes by pressing ahead pipe section into the ground, and also relates to an apparatus for carrying out such a method. The ground is loosened at the head of the pipe which is to be pressed ahead, and the removed ground material is conveyed to the back through the pipe for removal or processing. Supply lines run to the outside from the head of the pipe through the individual pipe sections. The apparatus includes at least one pressing unit for the pipe, as well as a guide way for the pipe.

2. Description of the Prior Art

During the production of pipes placed underground, trenching, and hence disruptive impacts on fixed and movable objects and persons above ground, can be dispensed with if the pipe, starting from a pit, is shoved or pressed through a hollow section which is cut or drilled into the ground. For pipe diameters of approximately 300 mm and greater, the pressing ahead of pipes into the ground is a known method. At the front end of the pipe, which comprises pipe sections which are placed together, and which is to be pressed in, a drilling or cutting unit is generally installed, with the aid of which the ground is loosened, is conveyed inwardly into the pipe which is to be placed, and is conveyed by suitable transporting means through the pipe, and via the pit, to the surface of the ground.

With this heretofore known method, it is necessary to install supply and removal lines through the pipe which is to be placed up to the removal equipment in the front region of the pipe. In particular, such lines are necessary for supplying power and water, and in certain cases compressed air, and for transmitting measuring and control data. However, every time a new pipe section is introduced and connected, these lines must be interrupted, guided through the new pipe section, and reconnected. During this reconstruction work, no advancement of the pipe can, of course, occur, and the removal operations in the front part of the pipe must be halted. When compressed air is used to brace or shore the work face, this supply of compressed air at the front end of the pipe should only be interrupted for a short period of time, so that in particular by-pass lines must make possible a short period of interruption when a new pipe section is introduced. In many cases it has been shown that considerably more time must be used for the reconstruction, during which the actual advancement operation is halted, than is required for the actual advancement of the corresponding pipe section. Thus, the reconstruction of the lines during introduction of a new pipe section is particularly disadvantageous for a speedy and efficient construction progress, and for a safe and reliable supply of the cutting or driving machine.

An object of the present invention is to provide a method and apparatus with which it is possible to achieve a quasi-continuous or continuous pressing advancement of a pipe into the ground without having long interruptions for the reconstruction of supply lines.

BRIEF DESCRIPTION OF THE DRAWINGS

This object, and other objects and advantages of the present invention, will appear more clearly from the following specification in conjunction with the accompanying drawings, in which:

FIG. 6 shows a cylindrical pipe, the pipe sections and partial pipe shells of which are held together in the axial and radial directions by helically extending tensioning means;

FIG. 7 is a cross section through a cylindrical pipe section, the partial pipe shells of which are held together by dowels;

FIG. 8 is a cross section through a cylindrical pipe section, the partial pipe shells of which are held together by a filler body;

FIG. 9 shows a further embodiment of an inventive apparatus for joining the partial pipe shells and at the same time pressing ahead a pipe section;

FIG. 9a is a schematic illustration of a joining station of the inventive apparatus for joining the partial pipe shells;

FIG. 9b is a schematic illustration of a combining station of the inventive apparatus;

FIG. 9c is a schematic illustration of a post treatment station of the inventive apparatus;

FIGS. 18 to 20 show further embodiments of pipe sections.

SUMMARY OF THE INVENTION

Figure 1:
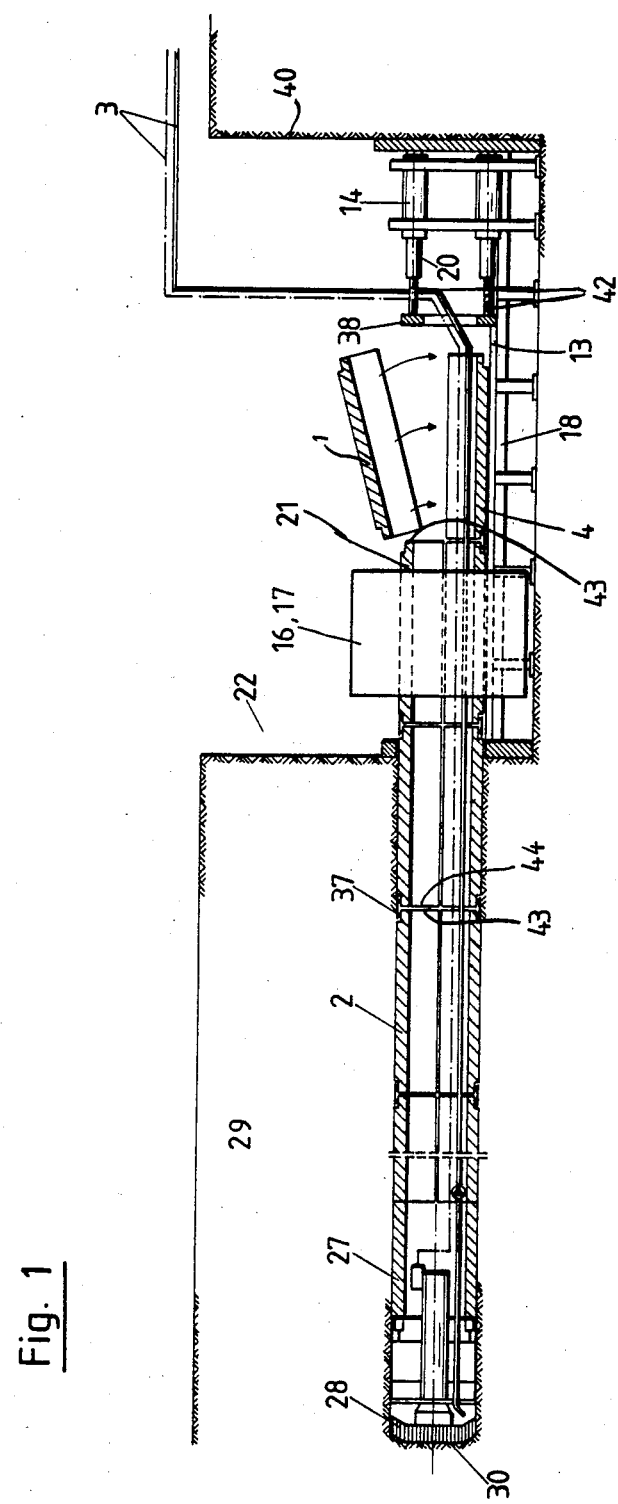
FIG. 1 is a schematic illustration of one inventive embodiment of an apparatus for carrying out the inventive method.

The method of the present invention is characterized primarily in that for each pipe section of the pipe which is to be installed, at least two partial pipe shells are used which are separated from one another in the longitudinal direction; before the pipe section is pressed ahead into the ground, the partial pipe shells which form it are joined about the supply lines which run in the pipe. With the inventive method it is possible for the first time to have a quasi-continuous or continuous advancing operation for placing pipes underground without this process having to be interrupted by time consuming shutdowns. The partial pipe shells are placed about the supply lines, and are subsequently interconnected to form a pipe section. A significant advantage of the inventive method consists in that it is no longer necessary to interrupt the supply lines when a new pipe section is pressed in, thus making it unnecessary to stop the supply and removal for the cutting machine. With the use of the inventive method, the placement capacity now depends only upon the capacity of the presses, and especially on the advancing capacity of the removal and conveying equipment. By saving time and personnel, the use of the inventive method promises a considerably more economical method of construction than was heretofore possible. The inventive method is suitable for all types of pipe material, namely for pipes of reinforced concrete, prestressed concrete, clay, asbestos, metals which can be joined by welding or adhesion, or synthetic material, the thicknesses of which must be dimensioned such that they can absorb the forces which occur during placement. Furthermore, the inventive method is not limited to pipes having a circular cross-section, but can also be used for all conceivable cross-sectional shapes which could be used.

The inventive method is particularly suitable for small to medium pipe diameters between 300 mm and 2000 mm, where previously the reconstruction times constituted a particularly great proportion of the total time consumed New aspects with regard to the possible saving of time and money are provided by using the inventive method for placing sewer lines, hydraulic pipes, gas pipes, long-distance heat pipes, protective pipes, etc.

The inventive apparatus is characterized primarily in that it comprises at least one joining station for joining the partial pipe shells in an exactly fitting manner about the supply lines, and a combining station for interconnecting the partial pipe shells.

With the inventive apparatus, the partial pipe shells can be joined together in a simple manner to form the pipe sections when they have been placed about the supply and removal lines. In the joining station, the partial pipe shells can be joined together about the supply lines in a precisely fitting manner. In the subsequent combining station, the partial pipe shells are then rigidly interconnected, for example by being adhesively connected, welded together, clamped together, cast together or prestressed. In a preferably adjoining post treatment station, the partial pipe shells which have been permanently joined together in this fashion can then, for example, be pressed together, heated up, filled, sealed, and/or thermally treated. The pipe section composed of the individual partial pipe shells therefore has the strength required for absorbing the advancing and pressure forces prior to being pressed into the ground.

DESCRIPTION OF PREFERRED EMBODIMENTS

Referring now to the drawings in detail, the inventive method is described with the aid of the apparatus illustrated in FIG. 1. FIG. 1 shows a pit 22, from which a pipe 2, which is composed of individual pipe sections 1, 4, is pressed ahead into the ground 29. In a known manner, the pipe 2 can be disposed in a precisely planned position by changes in direction of a cutting or driving machine 27, and by non-illustrated intermediate pressing and control pressing stations. The cutting machine 27 at the front end of the pipe 2 loosens the surrounding ground 29 and conveys it into the interior of the pipe 2, from where it is conveyed in closed conduits, or on conveyer belts, through the pipe to the pit 22, and from there to the surface of the ground. Most of the separating or processing units for converting the conveyed material from the ground into a transportable condition are installed beyond the pit 22. Further lines 3, which are conveyed through the pipe 2, supply the cutting machine 27 with power for driving the motors, with water for removing the waste, with power for lighting the interior of the pipe, and with measuring and control cables which transmit data or control commands.

The machine 27 is provided with a unit 28 for drilling, milling, or cutting, and for removing the ground 29. In some cases, the operation must take place with the aid of compressed air in order to protect the work face 30, especially when the latter is not vertical, or when pipes have to be placed through ground water or underground rivers. Furthermore, lines can be run in the pipe 2 to supply the cutting machine 27 with lubricants, oil under pressure, bentonite, and the like.

During the cutting action and advance at the work face 30, the entire pipe 2 is pushed ahead into the ground 29 by presses 14. These presses are supported against a side wall 40 of the pit 22 and push the pipe 2 from the back side thereof into the ground 29 to such an extent that the distance of the thrust corresponds to the length of a pipe section 1, 4. The presses 14 are provided with press rams 20, the piston rods 42 of which support a thrust ring 38 which during forward pressing rests against the rear end face 43 of the last-pipe section 21 of the pipe 2. When the presses 14 are retracted, a new pipe section 1, 4 can be placed between the last pipe section 21 of the pressed-ahead pipe 2 and the presses 14. For this purpose, a partial tube shell 4, in the illustrated embodiment a half tube shell, is shoved through below the supply lines 3 onto a feed surface 13 of a frame-like slide or gravity-roller conveyer 18 disposed in the pit 22.

One or more matching partial tube shells 1 are placed onto the shell 4 from above to for an exactly fitting closed pipe section. With pipes having a small to medium diameter, the positive connection between the partial pipe shells 1 and 4 can advantageously be produced by applying to the interfaces 7 of the partial tube shells (FIG. 2) adhesives which preferably harden rapidly. To increase the ability to absorb load, the partial tube shells 1, 4 can be pressed together into the adhesive surfaces in such a way that a compressive force results at right angles to these surfaces. To reduce the hardening time for the adhesive, and/or to increase the adhesive strength, heat with or without the use of pressure can be introduced into the region of the adhesive surfaces. The connection at the end faces 43, 44 of the tube sections 1, 4 can be effected by known methods for sealing and connecting the tube sections during forward pressing. For example, in the embodiment illustrated in FIG. 1, sealing members 37 are provided between adjacent pipe sections. The partial pipe shells 1, 4 are interconnected, for example adhesively joined, welded together, clamped together, cast, or prestressed, at a station 16. A further station 17 is provided for the post treatment of the partial pipe shells. The two stations 16 and 17 are accommodated in the pit 22. The recently connected pipe sections 1, 4 pass through the two stations 16, 17, so that no further handling of the pipe 2 is required after the stations 16 and 17.

Figure 2:
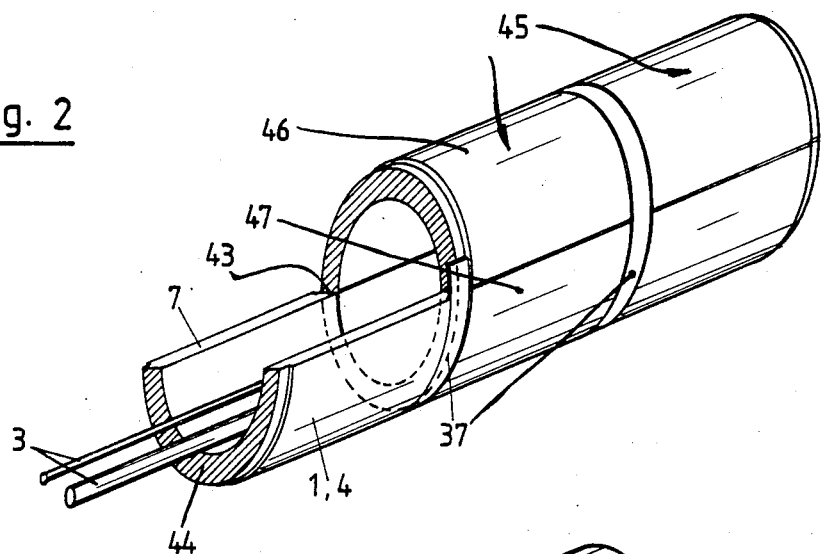
FIG. 2 is a partially sectioned view of a cylindrical pipe, the pipe sections of which comprise half pipe shells which are placed about supply lines.

In FIG. 2, the pipe sections 45 of the pipe are composed of half shells. The connecting means is applied to the interfaces 7 of the half shells 46, 46. Disposed between each pipe section 45 is a sealing member 37. The supply lines 3 are conveyed through the pipe.

Figure 3:
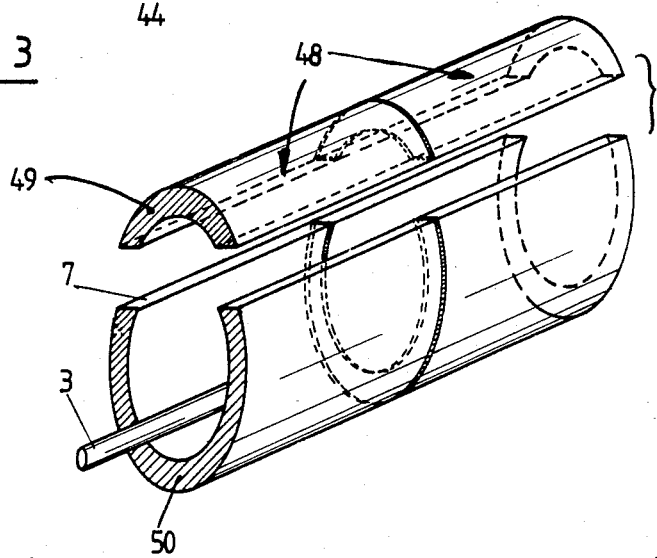
FIG. 3 shows a cylindrical pipe, the pipe sections of which comprise partial pipe shells having different-sized circular cross-sectional shapes.

FIG. 3 shows an embodiment in which the pipe sections 48 comprise partial pipe shells having different partial circular cross sections. The lower partial pipe shell 50 forms about ⅔ of the cross section of the pipe, while the upper partial pipe shell 49 forms about ⅓ of the pipe periphery. Again, the connecting means is applied to the interfaces 7. The end faces 43, 44 of the partial pipe shells 49, 50 are sealingly interconnected.

Figure 4:
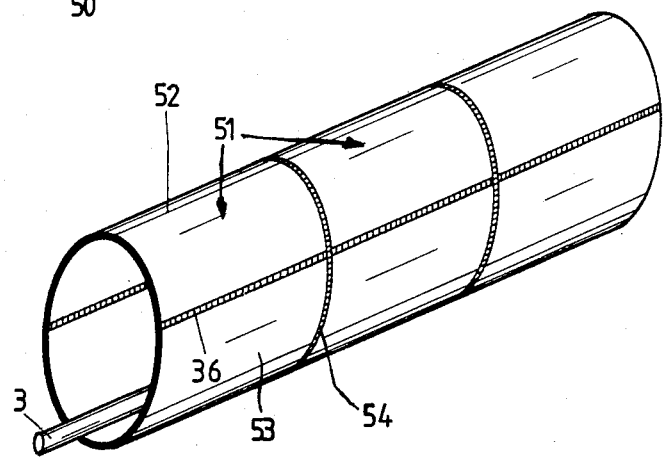
FIG. 4 shows a cylindrical pipe, the pipe sections of which comprise partial pipe shells of metal or plastic which have been welded or heat sealed together.

The pipe sections and their half or partial shells can also comprise steel or synthetic material. These materials can be welded or heat sealed, so that they can be interconnected in a simple manner. FIG. 4 shows such pipe sections 51, which are composed of half shells 52, 53. As described in connection with the embodiment of FIG. 1, these half shells are placed around the supply lines 3, and are then welded together. In the illustrated embodiment, not only the longitudinal seams 36 but also the radial ring-type joints 54 between the closed pipe sections 51 are welded. The weld seams 36, 54 generally form a secure connection after a short period of time; in other words, the welded-together pipe section 51 can already be loaded with the pressing force after a short period of time. In place of the half shells, two or more partial pipe shells can also be used, with these partial shells having different circular cross sections and being welded together to form the pipe section 51.

Figure 5:
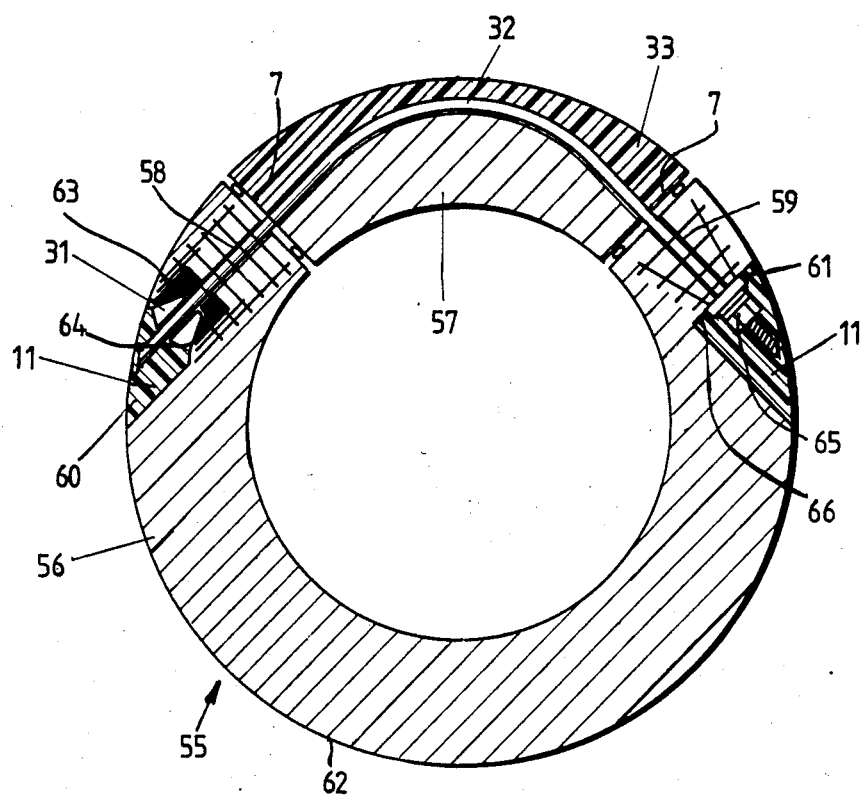
FIG. 5 is a radial section through a cylindrical pipe section of prestressed partial pipe shells.
Figure 5A:
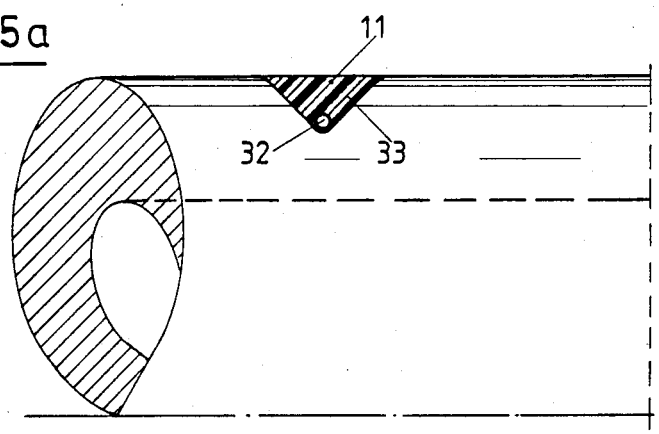
FIG. 5a is a longitudinal section through the pipe section of FIG. 5.

FIG. 5 shows two possibilities for interconnecting the half or partial pipe shells to form a pipe section. The pipe section 55 comprises two different partial pipe shells 56 and 57, which are interconnected by tensioning members 32. Each tensioning member 32 is in the form of a tensioning cable, which is placed in a groove-like recess 33 of the upper partial pipe shell 57, and is prestressed. The recesses 33 are spaced from one another, extend in the circumferential direction of the pipe section 55, and are open toward the outside (FIG. 5a). They taper radially inwardly, so that the tensioning member 32 can be easily placed therein. As shown in FIG. 5, the recess 33 extends into the two interfaces 7 of the partial pipe shell 57. The lower partial pipe shell 56 is provided with holes 58 and 59 which open into the interfaces 7 of the partial pipe shell and also open into recesses 60, 61 in the outer side 62 thereof; the ends of the tensioning member 32 project through the holes 58 and 59. FIG. 5 shows two variations for securing the prestressed tensioning member 32. In the left half of FIG. 5, conical parts 31 are provided as the retaining means; these parts 31 engage around the end of the tensioning member 32, and extend into a conical recess 63 of an abutment 64 disposed in the recess 60.

As illustrated in the right half of FIG. 5, the two ends of the prestressed tensioning member 32 can also be secured by tightening screws 65 which are screwed onto the tensioning members, and are supported against a side wall 66 of the recess 61.

In the embodiment of FIG. 6, the groove-like recesses 33 for the tensioning member 32, which is in the form of a tensioning cable, are provided in both of the partial pipe shells 67, 68 of the pipe sections 69; the recesses 33 extend helically about the pipe, and intersect one another. A nonillustrated combination winding and tensioning machine places the tensioning cable 32 into the recesses 33 and tensions it. The partial pipe shells 67, 68, which are precisely fitted together, are thereby secured. As a result of the helical course of the tensioning member 32, the pipe sections 69 are held together in the axial direction, and the partial pipe shells 67, 68 are held together in the radial direction. Advantageously, for sealing purposes suitable elements 71 in the form of sealing strips or the like are placed in the planes of separation 70 between adjacent pipe sections 69 prior to the securement of the latter. These sealing elements 71 prevent material from inside the pipe 2 from getting out, and vice versa. The tensioning members 32 are held by appropriate retaining means as discussed in connection with FIG. 5.

The recesses 33, 60, 61 in the pipe sections 55, 69 for receiving the tension-locking devices 63, 64, and 65, and the tensioning cables 32, can expediently be filled with a suitable filler 11, such as casting resin, so that a uniform pipe surface is again produced, and protection against corrosion is provided.

FIG. 7 shows a pipe section 72, the partial pipe shells 73, 74 of which are in the form of half shells and are interconnected by dowels 8. In the embodiment shown in the left half of FIG. 7, holes 76 are provided for receiving the dowels 8; these holes 76 extend from the outer side 75 of the partial pipe shells 73, 74 to the interfaces 7, are disposed at right angles to these interfaces, and are aligned with one another. When the interfaces of the two partial pipe shells 73 and 74 are precisely fitted upon one another, the dowels 8 can subsequently be inserted into the holes 76. Along the interfaces 7 a plurality of spaced apart holes 76 are provided, so that the two partial pipe shells 73, 74 are rigidly interconnected over their entire length. After the dowels 8 have been inserted, and project into the holes 76 of both of the partial pipe shells 73, 74, the remainder of the holes are filled with a filler 11. The dowels 8 are thereby securely held, and the outer side 75 of the pipe sections contain no interruptions.

In the embodiment illustrated in the right half of FIG. 7, the dowels 8 are inserted in blind holes 77 in the interfaces 7 of one of the partial pipe shells 73 or 74. The interfaces 7 of the other partial pipe shell 74 or 73 are provided with corresponding blind holes 77 into which the dowels 8 can then extend. Adhesive is again applied to the interfaces of the partial pipe shells 73, 74. The dowels 8 then serve to enhance the transfer of force in the adhesive joint.

FIG. 8 shows partial pipe shells 78, 79 which are in the form of half shells and are joined together to form a pipe section 80. Dowel rods or metal loops 10 are placed in the interfaces 7 of the partial pipe shells 78, 79 and extend beyond these interfaces. In the installed position, these parts overlap one another when viewed in the longitudinal direction of the partial pipe shells 78, 79. The intermediate space 9 between the partial pipe shells 78, 79 is filled in with filler, which together with the overlapping connecting elements 10 results in a strong and tight connection between the partial pipe shells.

All of the types of connection illustrated by way of example have the advantage that a positive and form fitting connection of the partial pipe shells and pipe sections to form a pipe can be rapidly produced. The time required is set by the selection of the various connecting methods and means in such a way that no more time is required for the entire process of joining together the partial pipe shells up to the time that the pipe section is received in the pressing section than is needed for pressing ahead a pipe section having the same length.

FIG. 9 shows an apparatus in which, between the advancing presses 14 and the last pipe section 21 of the pipe 2, stations 15-17 are interposed for joining the partial pipe shells and for post treating the connection points. The stations are moved on a carriage or support 19 on the slide or gravity-roller conveyer 18 with the same speed as is the advancedpipe. All pressing forces are conveyed around the pipe section which is to be joined together. During the advancing movement, the partial pipe shells located in the stations 15-17 are joined to form the pipe section, and are interconnected. If the last pipe section 21 of the pressed-ahead pipe 2 is pushed far enough into the ground 29 by the press rams 20 and the thrust ring 38, the stations 15-17 are retracted and the thrust ring 38 is retracted by the press rams 20. The thrust ring 38 comprises two semi-circular halves, which prior to being retracted are pivoted to the side, so that they can be moved past the movable stations 15-17. The thrust ring 38 is then pressed against the new last pipe section, which is already connected to the pipe 2. The stations 15-17 are thus ready to receive the partial pipe shells for a new pipe section. The advancing movement of the pipe 2 can be denoted as being quasi-continuous, since the duration of interruption during pressing ahead only consists of the time for retracting the stations 15-17, for applying the pressing force, and for receiving the partial pipe shells. Whereas with the heretofore known apparatus the time for introducing a new pipe section required approximately one to four hours, this time is reduced pursuant to the method of the present invention to approximately five to ten minutes.

The stations for joining the partial pipe shells and for post treatment comprise, for example with the adhesive method, units for fixing the partial pipe shells, for cleaning the adhesive surface, for applying the adhesive, for joining the partial pipe shells in an exact fit, for pressing the adhesive surfaces together, and, to the extent necessary, for heating the adhesive surfaces or removing excess adhesive.

When steel or plastic pipes are welded or heat sealed, the stations advantageously comprise a unit for fixing the partial pipe shells, an automatic welding unit for connecting the partial pipe shells, and a unit for post treating the weld seam, for example by thermal treatment or by removing burrs.

The station 15 contains a device for joining the partial pipe shells so they fit exactly together. This device can, for example, comprise a fixing arresting of the bottom partial pipe shell, and a gripper arm which receives the upper partial pipe shell and, via numerous control commands or fixation points on the partial pipe shells themselves, precisely joins these partial shells together to form a pipe section. FIG. 9a shows one such joining station, which can also be utilized with the other embodiments. The joining station 15 is provided with a positioning device 146 with which the distance of two hydraulic cylinders 142.1 and 142.2 from one another can be adjusted. The latter are connected by holding rods 145 which can be moved in guides 146.1 and 146.2 which are parallel to one another. The distance of the hydraulic cylinders 142.1 and 142.2 from one another depends upon the length of the partial pipe shells 1 and 4 which are to be joined together. The holding rods 145 are connected to the hydraulic cylinders 142.1, 142.2, which can be moved along a holding bar 144. Connected to the piston rods of the hydraulic cylinders 142.1, 142.2 are gripper arms 143.1 and 143.2 in the form of tubular clamps which extend over and clamp the partial pipe shells 4. The lower partial pipe shells 1 are placed upon supporting saddle pieces 140.1 and 140.2, which are disposed upon the carriage 19. Although not shown in further detail, the saddle pieces 140.1, 140.2 are provided with fixing devices 141, for example clamping pieces with which the position of the partial pipe shells 1 can be fixed in the saddle pieces.

The station 16 contains a device for exactly fitting and permanently joining the partial pipe shells. If these partial shells are adhesively joined, this device can, for example, comprise a unit for the surface application of the adhesive. The unit can comprise a reservoir for receiving the adhesive, and a rotating adhesive-applying roller. When the partial pipe shells are welded together, the device in station 16 advantageously comprises an automatic welding unit, or a welding robot which undertakes the welding as a controlled process. If the partial pipe shells are prestressed or connected by dowels, the device advantageously comprises an automatic unit for inserting or winding the tensioning cable and prestressing the same. In the connecting station 16 of FIG. 9b, adhesive is applied to the end faces of the two partial pipe shells 1, 4 which are clamped to the supporting saddle pieces 140.1, 140.2 and are held securely in position by the gripper arms 143.1, 143.2. For this purpose, the carriage 19 with the supporting saddle pieces 140.1, 140 2, the partial pipe shells 1, 4, the gripper arms 143.1, 143.2, the holding bar 144, and the positioning device 146 are conveyed into the vicinity of an adhesive-applying unit. This unit has, disposed parallel to one another, two roller guides 149 for two adhesive rollers 147, each of which is provided with an adhesive feed 148. The adhesive-applying unit is disposed between the two partial pipe shells 1, 4, over the end faces of which the adhesive rollers 147 roll to apply the adhesive 150.

The station 17 is a post treatment unit for removing burrs from weld seams, for introducing pressure into the adhesive joint, for thermal post treatment, for filling in joint material, for subsequent filling of recesses and hollow spaces, or for producing a closed surface which is true to the cross-sectional shape, for example for protection against corrosion. Depending upon which of these tasks is to be performed, the device of the station 17 can, for example, comprise controlled deburring knives or grinding units, pressure or guide pistons, a microwave unit, a filling and dosing container and an injection device for introducing joint material, and/or devices for smoothing the surface, for example in the form of laminarly operating, surface-smoothing units.

In the post treatment station 17 of FIG. 9c, the pistons of the hydraulic cylinders 142.1, 142.2 are extended, and the partial pipe shell 4 is firmly pressed onto the partial pipe shell 1. Since the holding rods 145 can be infinitely adjusted in the guides 146.1, 146.2, the partial pipe shell 4 can be precisely aligned in a simple manner relative to the partial pipe shell 1, so that the two partial pipe shells can be joined together in a precisely fitting manner. In order to accelerate hardening of the adhesive 150, hot air blowers 151 are provided for blowing hot air into the region of the adhesive joint.

Figure 10:
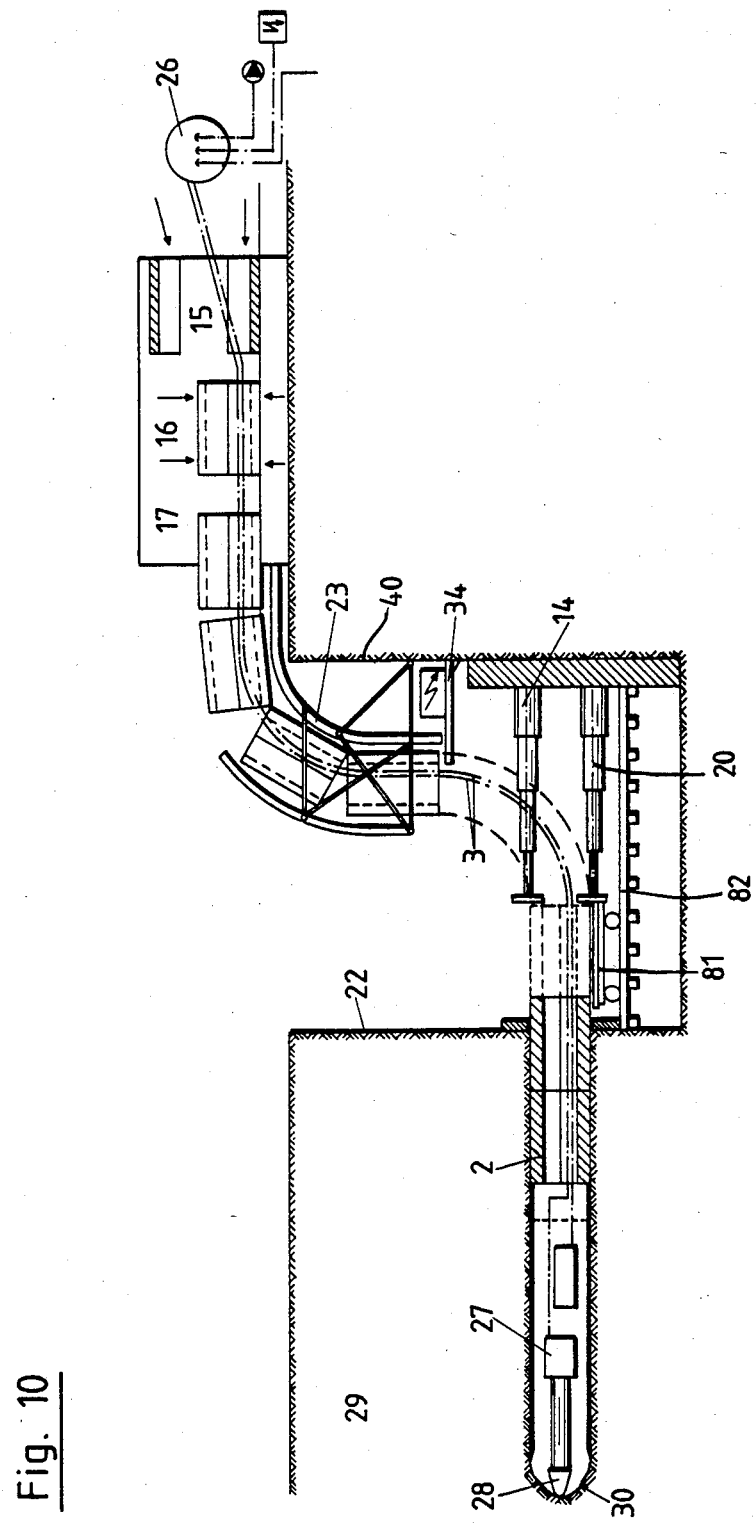
FIG. 10 is a further embodiment of an inventive apparatus for quasi-continuously advancing the pipe, the partial pipe shells of which are joined above the pit.

A further possible embodiment is illustrated in FIG. 10. This apparatus is particularly suitable when the pit 22 must be kept small or very deep. Furthermore, this embodiment has the advantage that the surface of the ground provides enough place and good accessibility, as well as the possibility for covering the stations 15-17 which are disposed at this location, i.e. externally of the pit. Depending upon the material from which they are made, the partial pipe shells are positively interconnected in a form fitting manner in the stations 15-17 as described in connection with FIG. 9, and to the extent necessary, are post treated. The partial pipe shells which are joined to form pipe sections are subsequently conveyed onto an S-shaped curved conveyer 23 from the surface of the ground into the pit 22. A catching device 34 is disposed on the side wall 40 of the pit 22, and holds back the pipe sections which are supplied on the conveyer 23 until the press rams 20 are retracted after pressing ahead the pipe 2. The catching device 34 then frees the next pipe section, which slides downwardly on the conveyer 23 onto a carriage 81 which can be moved along a guide way 82. As soon as the pipe section has passed the catching device 34, the latter returns to the blocking position illustrated in FIG. 10, in which position it holds the further pipe sections in a holding position until the appropriate withdrawal of the press rams 20. The supply lines 3 within the pipe sections are guided over suitable devices through the pipe sections to a location ahead of the stations 15-17, where they are wound onto drums 26 from which they can be continuously extended. Though not shown in greater detail, the drums 26 are, in turn, connected to a supply unit for power, water, and compressed air, and to a removal spot for the rubble or waste material. In this manner, a closed supply line is formed from the work face 30 o the cutting machine 27 to the supply unit and the removal spot. The apparatus of FIG. 10 assures a quasi-continuous installation of the underground pipe, with the forward drive only being interrupted by the withdrawal of the press rams 20, the introduction of a new pipe section, and the renewed application of the press rams.

Figure 10A:
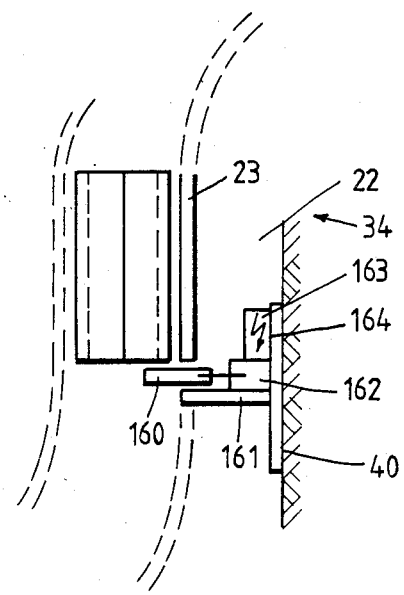
FIG. 10a is an enlarged schematic illustration of a catching device of the inventive apparatus of FIG. 10.

FIG. 10a shows one embodiment of a catching device 34. A guide 161, which extends at right angles to the side wall 40 of the pit 22, is mounted to the side wall 40 by means of a retainer 164. A catching member 160 can be moved on the guide 161, and is mounted to the free end of the piston rod of a trip cylinder 162 disposed on the guide 161. The trip cylinder 162 is controlled by a switching unit 163. When the piston rod of the cylinder 162 is extended, the catching member 160 is disposed in the transport path of the pipe sections, which are thereby held in a holding position. When the trip cylinder 162 receives a signal from the switching unit 163, it retracts the piston rod. The pipe section is thus released, and can slide downwardly along the conveyer 23. As soon as the pipe section has passed the catching member 160, the trip cylinder 162 again receives a switching pulse from the unit 163, so that the piston rod is extended and the catching member 160 again extends into the transport path in order to catch the following pipe section.

Figure 11A:
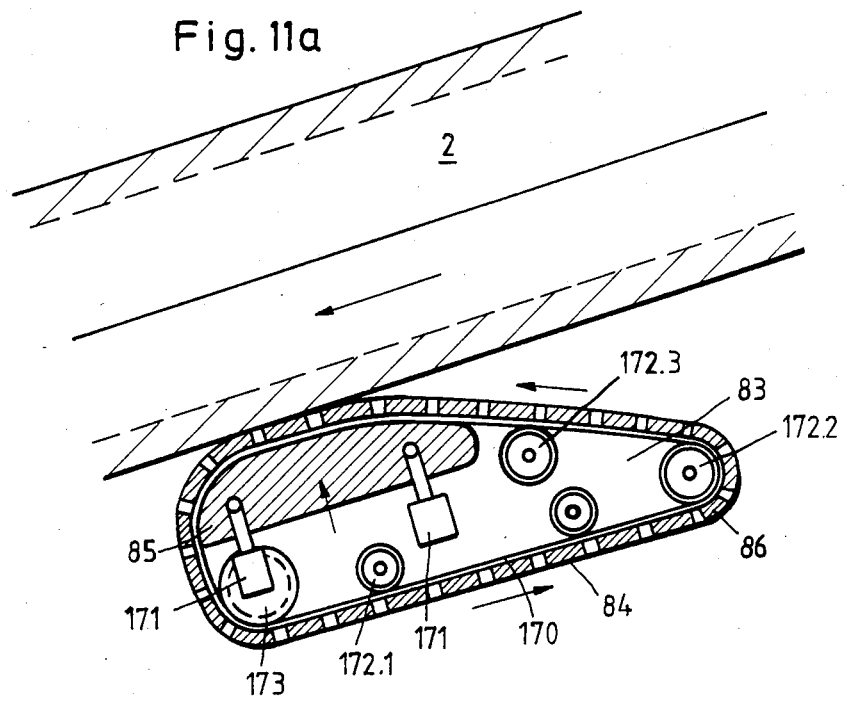
FIG. 11a is an enlarged schematic illustration of an advancing and pressing unit of the inventive apparatus of FIG. 11.
Figure 11:
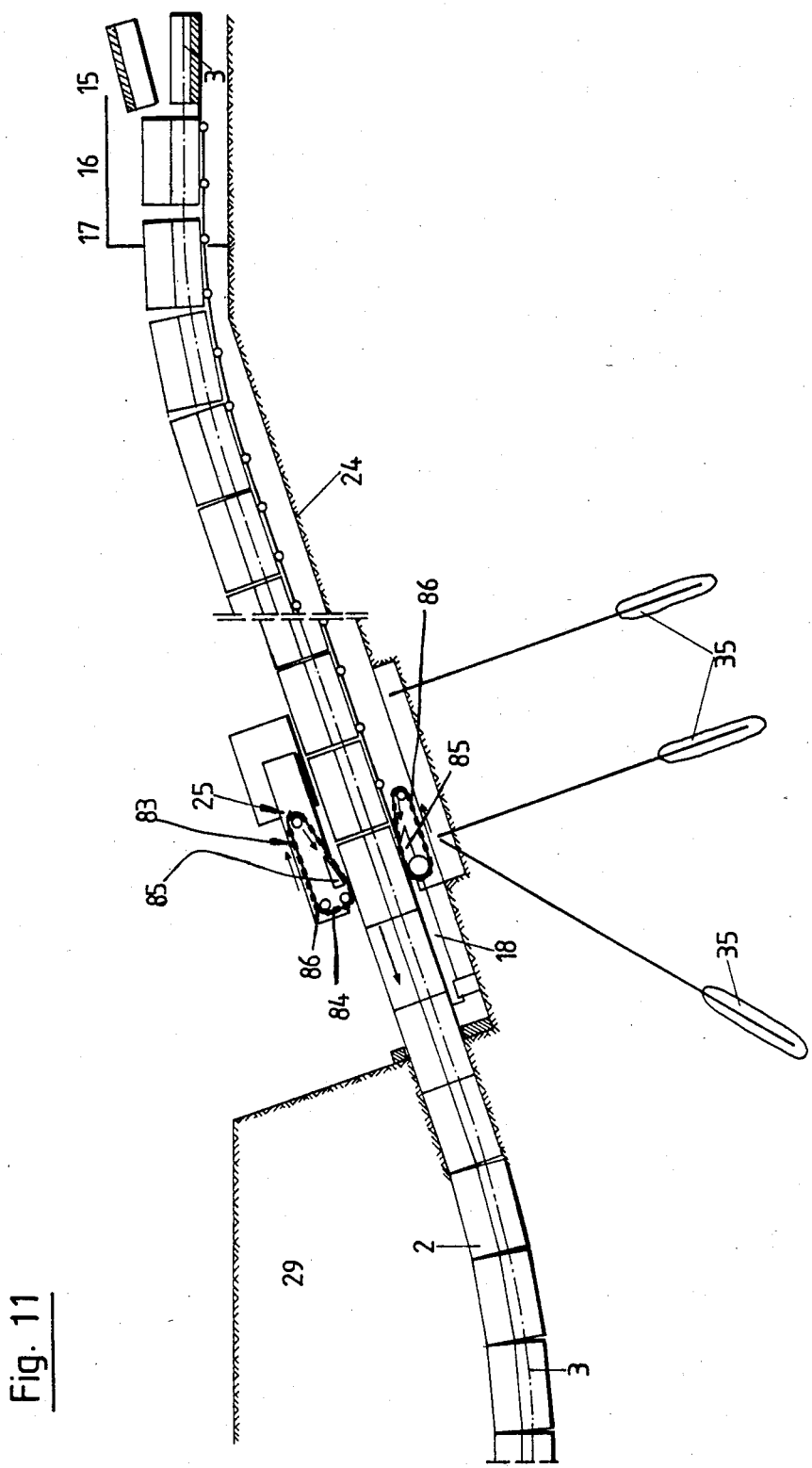
FIG. 11 shows a further embodiment of an inventive apparatus for continuously advancing the pipe, the partial pipe shells of which are joined behind the pressing unit and are subsequently continuously pressed into the ground.

FIG. 11 shows a further apparatus for advancing a pipe 2. This embodiment permits a continuous advance, i.e. without having to interrupt the advancement. The partial pipe shells are joined together about the supply lines 3 in the region above the thrust press 25, which is embodied in such a way that the pipe 2, which is composed of the individual pipe sections, is conveyed through the press. The press 25 includes advancing and pressing units 83 which are distributed about the periphery of the pipe 2. Each unit is provided with endless rotating pressure members 84 which are disposed against the outer side of the pipe and produce the advancement movement. The side of the pressure members 84 facing the pipe 2 is moved over a guide 85, which has a wedge-shaped cross section and presses this side against the pipe. The pressure members 84, which are continuously driven in the direction of advancement, are formed by conveyer chains, cables, and the like, which are provided with pressure elements 86.

As shown in FIG. 11, the entire apparatus can be disposed on an inclined ramp 24. As a result, it is possible for vehicles and construction equipment to directly approach the pit 22, and the pipe 2 can be completely assembled prior to entering the thrust presses 25.

FIG. 11a shows one embodiment of an advancing and pressing unit 83. The endless rotating pressure member 84 is provided on an endless conveyer chain 170, which is moved over guide rollers 172.1, 172.2, 172.3 and over a drive roller 173. The wedge-shaped guide 85 is mounted to the piston rods of pressure cylinders 171, with which the guide is pressed against the inside of the conveyer chain 170 and against the pressure member 84. As a result, the pressure member 84 is pressed against the pipe 2, thus exerting an advancing force thereagainst. At least three of these advancing and pressing units 83 are distributed about the periphery of the pipe 2. The transmission of force is effected from the drive roller 173 via the conveyer chain 170 and the pressure member 84 onto the wall of the pipe 2.

By means of suitable ground anchors 35, the advancing force of the press unit 25 can be braced relative to the ground 29. Guide and control units provided at the front end of the pipe 2 orient it in the desired direction, so that horizontal pipes 2 can also be placed via the inclined ramp 24. In the region of the thrust presses 25, the pipe sections of the pipe 2 are guided on the slide or gravity-roller conveyer 18 prior to entering the ground.

Figure 12:
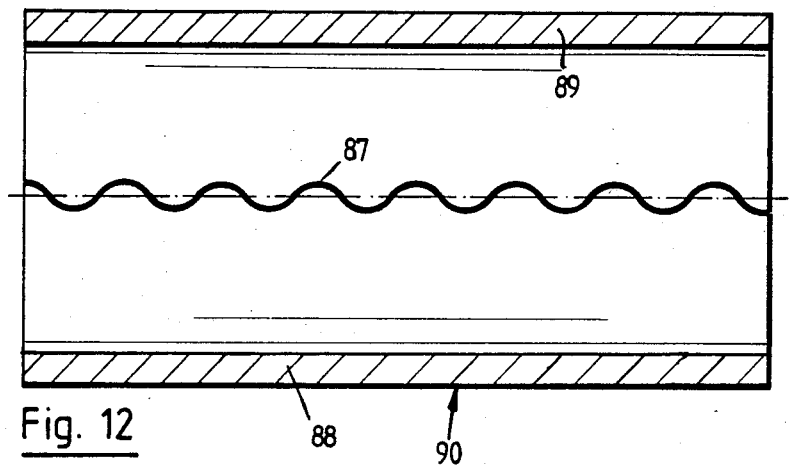
FIGS. 12 and 13 are longitudinal sections of two further embodiments of pipe sections, the interfaces of which ar constructed for receiving forces which act in the longitudinal direction.

Whereas with the previously described embodiments the interface of the partial pipe shells was planar, the interface 87 of the partial pipe shells 88 and 89 of FIG. 12 is wavelike. As a result, a positive connection between the two partial pipe shells 88 and 89 is achieved in the longitudinal direction of the pipe section. This further increases the cohesion of the partial pipe shells. As described in connection with the previous embodiments, the interfaces 87 of the partial pipe shells 88, 89 of the pipe section 90 can be adhesively interconnected, can be welded together, or can be connected by some other means.

Figure 13:
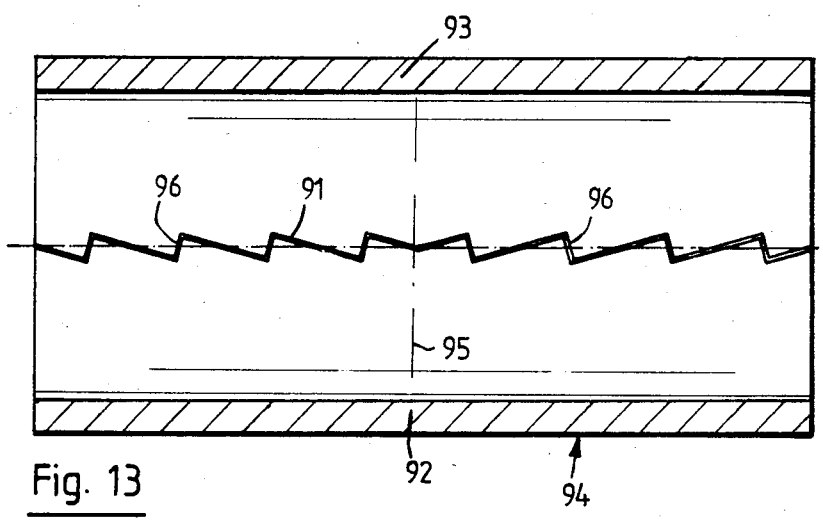

In the embodiment of FIG. 13, the interfaces 91 of the partial pipe shells 92, 93 are saw-toothed. So that a positive connection between the two partial pipe shells 92, 93 is achieved in both longitudinal directions of the pipe section 94, the saw-toothed construction of the interfaces 91 has mirror symmetry relative to the transverse central plan 95. The interfaces 91 have abutment surfaces 96 which are disposed at an angle to the longitudinal direction of the pipe section 94, and which in both halves of the pipe section are inclined in opposite directions relative to one another. As a result, the partial pipe shells 92, 93 can brace against these abutment surfaces 96 when force is exerted against them in the longitudinal direction.

Figure 14:
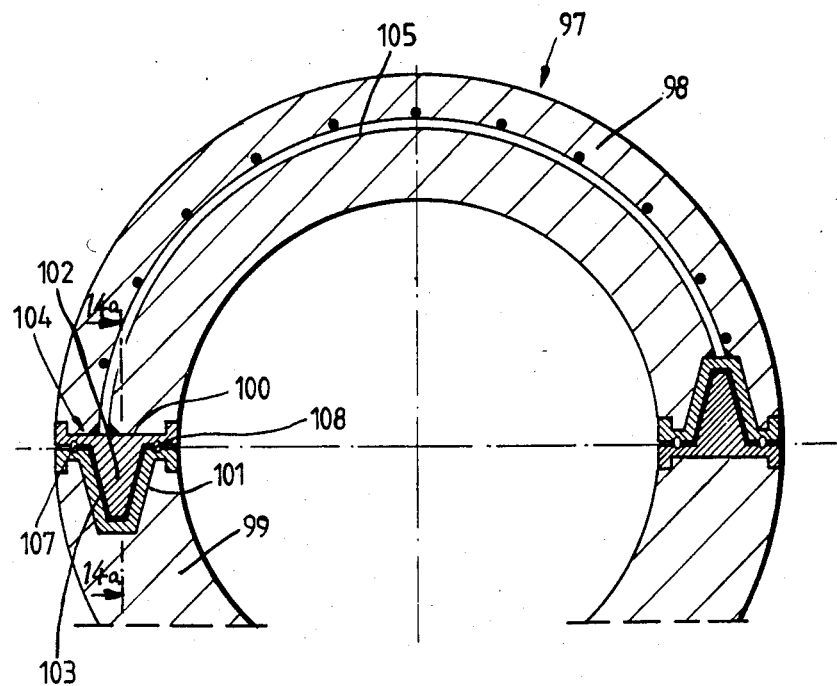
FIGS. 14 and 14a are a cross section and a longitudinal section of a cylindrical pipe section, the partial pipe shells of which have interfaces which are provided with form-locking members.
Figure 14A:
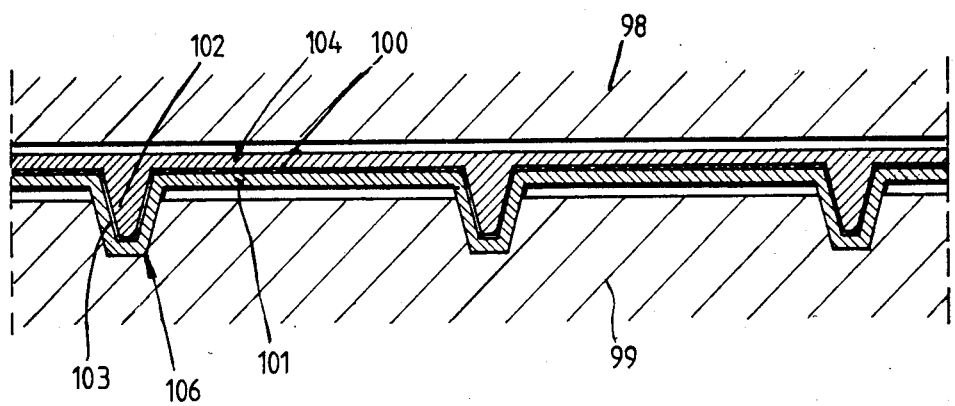

FIGS. 14 and 14a show a pipe section 97, the partial pipe shells 98 and 99 of which are in the form of half shells, and are provided with projections 102 and corresponding recesses 103 along their interfaces 100 and 101. The projections 102 have a trapezoidal cross section, and taper in the direction toward their free end. The partial pipe shells 98 and 99 are placed upon one another in such a way that the projections 102 extend into the corresponding recesses 103. The projections 102 and the recesses 103 are distributed equidistantly along the interfaces 100 and 101. As a result, a positive connection between the two partial pipe shells 98 and 99 is produced in the longitudinal direction of the pipe section; force can be applied to these partial pipe shells in both longitudinal directions. The projections 102 are parts of a profiled steel part 104 which is welded onto that face of the partial pipe shell 98 which extends in the longitudinal direction. For this purpose, a semi-cylindrical steel plate 105 is installed in the partial pipe shell 98; the profiled steel part 104 can be welded onto this steel plate 105. The recesses 103 are similarly provided in a profiled steel part 106 which is installed in that face which extends in the longitudinal direction of the partial pipe shell 99. Disposed between the two partial pipe shells 98 and 99 are sealing members 107, 108 which extend over the entire length of the partial pipe shells and prevent material from moving from the inside of the pipe section 97 to the outside, and vice versa. The two positively intermeshing profiled steel parts 104 and 106 can, for example, be welded together or can be interconnected with dowels, tensioning screws, and the like.

Figure 15:
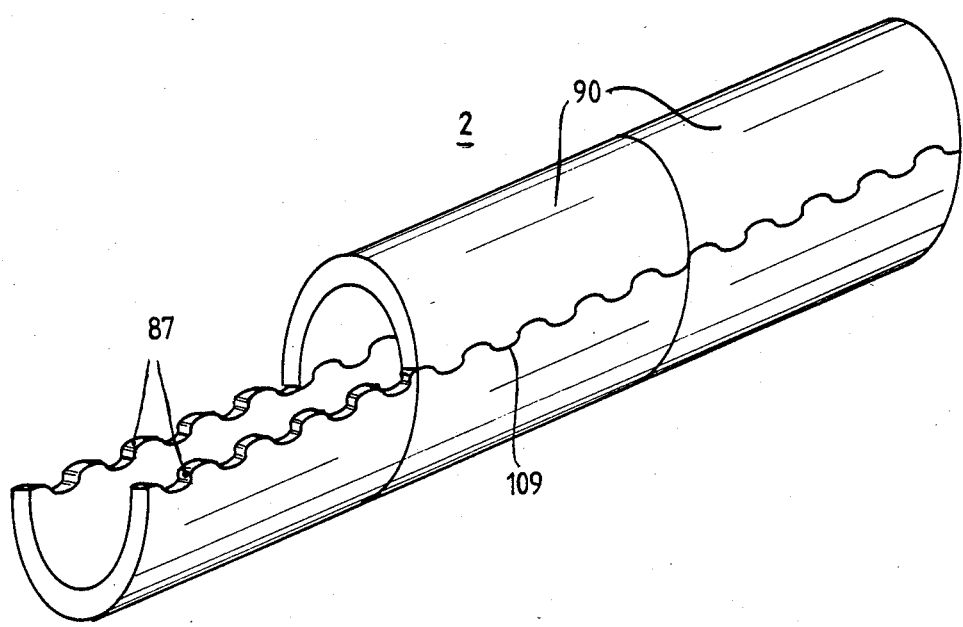
FIG. 15 shows a cylindrical pipe, the partial pipe shells of which have wavelike interfaces.

FIG. 15 shows the pipe 2 with the pipe sections 90 of FIG. 12. As a result of the wavelike construction of the interfaces 87, a corresponding wavelike joint 109 results.

Figure 16:
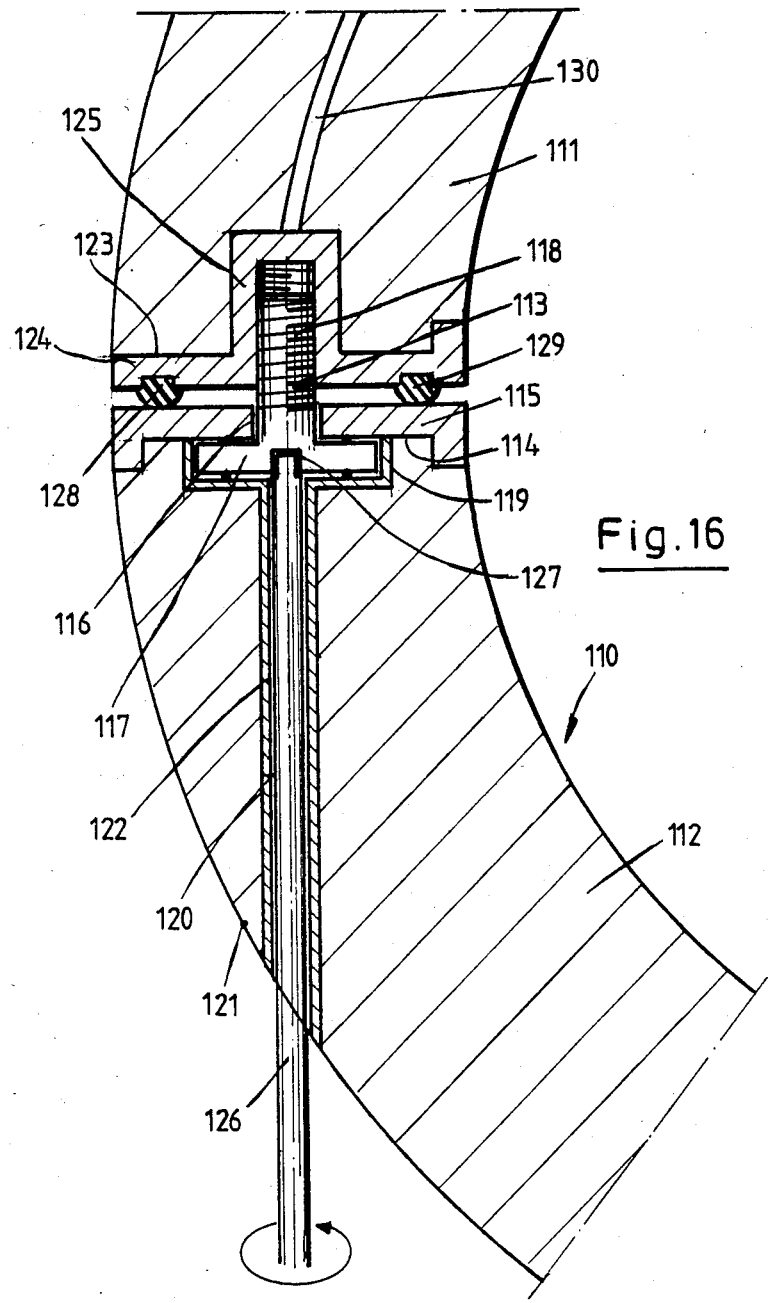
FIG. 16 is a cross section through a portion of a cylindrical pipe section, the partial pipe shells of which are held together by tensioning screws.

In the pipe section 110 of FIG. 16, the two partial pipe shells 111 and 112 are interconnected by tensioning screws 113 in a positive and form-fitting manner. Mounted on that face 114 of the partial pipe shell 112 which extends in the longitudinal direction of the partial pipe shell, is a strip 115 which is provided with openings 116 for the tensioning or tightening screws 113 at equal intervals along the face 114. The heads 117 of the screws 113 are disposed below the strip 115, and the shafts 118 of the screws project outwardly through the holes 116 at right angles to the face 114. The screw heads 117 are accommodated in appropriate recesses 119 in the face 114. Each recess 119 is connected with the outside 121 of the partial pipe shell 112 by means of a hole 120 which opens into the center of the recess 119. The hole 120 and the recess 119 are preferably provided with a lining 122.

A further strip 124 is mounted on the face 123 of the other partial pipe shell 111. This strip 124 is provided with cup-shaped recesses 125 for receiving the screw shafts 118.

The two partial pipe shells 111, 112 are placed upon one another in such a way that the screw shafts 118 can extend into the associated recesses 125. A wrench, such as an Allen wrench, or some other tool, is inserted from the outside 121 through the hole 120. The tool 126 engages a form-locking opening 127 provided in the screw head 117, and can thereby rotate the tensioning screw 113. By tightening the latter, the partial pipe shell 111 is pulled tightly against the partial pipe shell 112. Two profiled sealing members 128 and 129 are disposed between the two strips 115 and 124. In the illustrated embodiment, these sealing members 128, 129 are anchored in the strip 124, and are compressed when the screws are tightened. In this embodiment also, the strip 124 can be welded onto a semi-cylindrical plate 130 which is installed in the partial pipe shell 111.

In addition to cylindrical pipes, as have been described in the previous embodiments, the pipe sections can also, to the extent that this is expedient, have other cross-sectional shapes, such as elliptical, egg-shaped (FIG. 18), or square or rectangular (FIG. 19) cross-sectional shapes.

Figure 17:
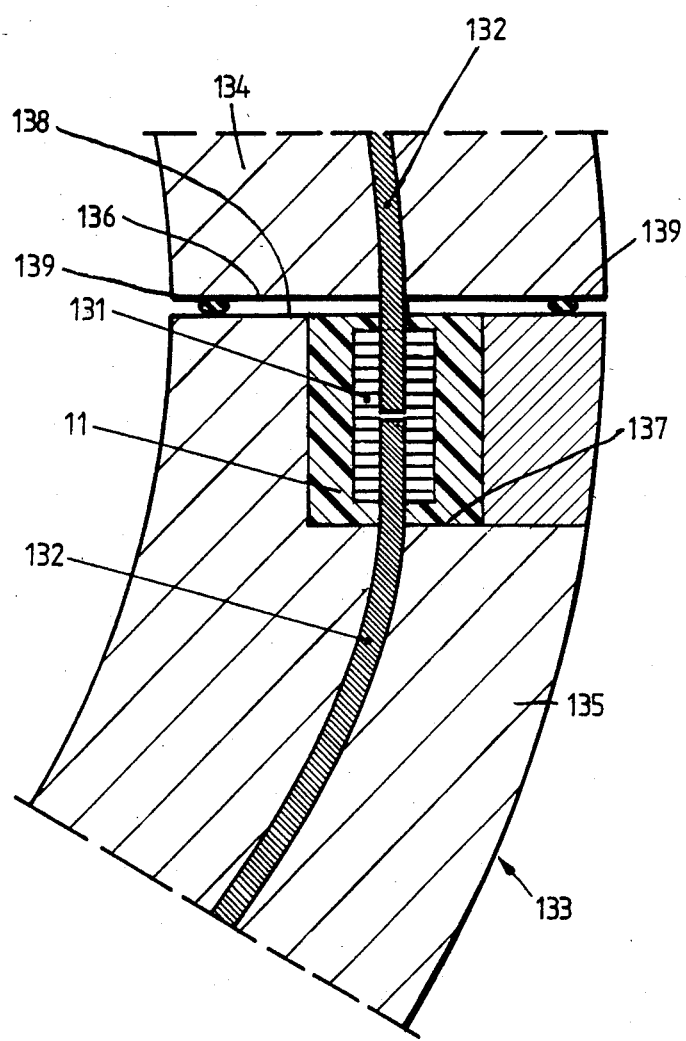
FIG. 17 is a partial cross section of a cylindrical pipe section, the partial pipe shells of which are held together by pressure sleeves.

In the pipe section 133 of FIG. 17, both partial pipe shells 134, 135 are provided with steel reinforcing members 132. The reinforcing member 132 of the partial pipe shell 134 projects beyond a longitudinal edge 136 thereof, while the one end of the reinforcing member 132 of the partial pipe shell 135 is disposed in a recess 137 in the longitudinal edge 138 of this partial shell. When the longitudinal edges 136, 138 of the partial pipe shells 134, 135, accompanied by the interposition of sealing elements 139, are placed upon one another, the ends of the reinforcing members 132 are disposed within the recess 137. A pressure sleeve or clamp 131 provided in the recess 137 frictionally holds these ends together. The remaining space of the recess 137, which is open toward the outside of the partial pipe shell 135, is filled with the joint material 11 of plastic or a cement base.

In all of the embodiments, those end faces of the pipe sections which face one another can be adhesively interconnected to form the pipe.

FIG. 20 shows a pipe section composed of three partial pipe shells. Each of the partial pipe shells has a different shape, and their interfaces are positively interconnected. The partial pipe shells can also be interconnected by a slot construction.

The present invention is, of course, in no way restricted to the specific disclosure of the specification and drawings, but also encompasses any modifications within the scope of the appended claims.

What we claim is:

1. A method of producing an underground pipe by pressing pipe sections into the ground; the ground is loosened at the head of the pipe which is to be pressed ahead, and the loosened ground is conveyed backwards through the pipe for removal or processing; supply lines are run from the head of the pipe all the way through the individual pipe sections to the back; the improvement therewith which includes the steps of:

using at least two partial pipe shells, which are separated from one another in the longitudinal direction, for each of said pipe sections of said pipe;

joining said partial pipe shells together around said supply lines to form a pipe section;

pressing said last-mentioned pipe section against the previously formed pipe section and into the ground;

carrying out said joining step and the pressing of the previously formed pipe section at the same time, and moving said partial pipe shells in the direction of advancement at the same speed as said pressing speed.

2. A method of producing an underground pipe by pressing pipe sections into the ground; the ground is loosened at the head of the pipe which is to be pressed ahead, and the loosened ground is conveyed backwards through the pipe for removal or processing; supply lines are run from the head of the pipe all the way through the individual pipe sections to the back; the improvement therewith which includes the steps of:

using at least two partial pipe shells, which are separated from one another in the longitudinal direction, for each of said pipe sections of said pipe;

joining said partial pipe shells together around said supply lines to form a pipe section;

pressing said last-mentioned pipe section against the previously formed pipe section and into the ground;

combining said pipe sections with said pipe prior to said pressing step, and continuously advancing said pipe while at the same time attaching further pipe sections to that end of said pipe remote from said head thereof.

3. A method according to claim 2, which includes the step of using two half pipe shells for each pipe section.

4. A method according to claim 2, which includes the steps of fixing said partial pipe shells in a precisely fitting manner to interconnect them, and subsequently filling joint spaces.

5. A method according to claim 2, which includes the steps of providing partial pipe shells made of a material selected from the group consisting of metals and plastics, and thermally interconnecting said partial pipe shells prior to said pressing step.

6. A method according to claim 2, which includes the steps of providing each of said partial pipe shells with longitudinally extending faces, applyin an adhesive to said faces, and joining said partial pipe shells together in a precisely fitting manner to form a complete pipe section.

7. A method according to claim 6, which, to reduce the hardening time of the adhesive and/or to increase the strength of the adhesive, includes the step of applying heat in the region of said faces, with or without the additional application of pressure.

* * * * *